UNITED STATES PATENT OFFICE.

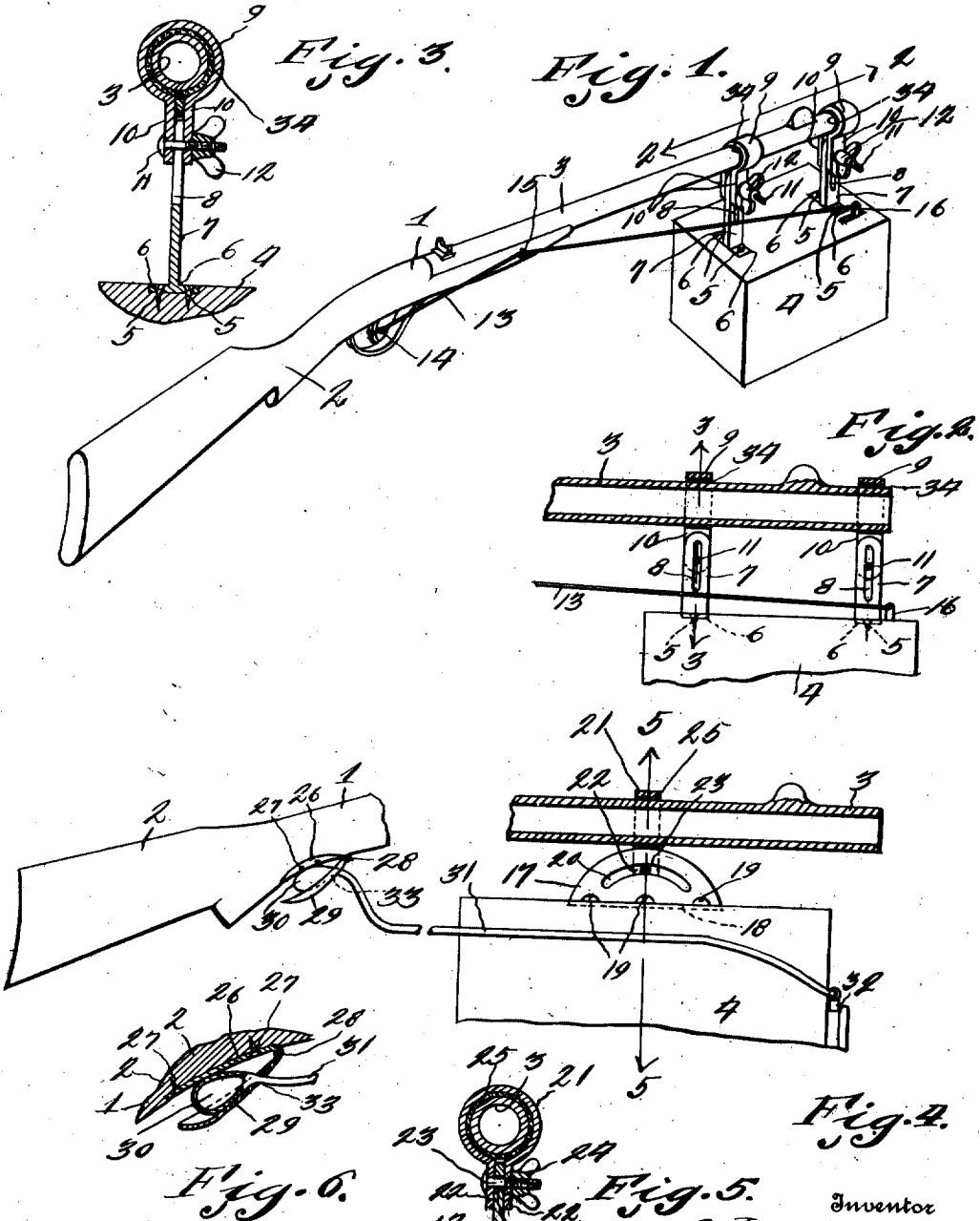

GEORGE LANDIS, OF EUGENE, OREGON.

PORTABLE SUPPORT FOR CAMERAS.

1,236,947.  Specification of Letters Patent.  Patented Aug. 14, 1917.

Application filed August 2, 1916. Serial No. 112,868.

*To all whom it may concern:*

Be it known that I, GEORGE LANDIS, a citizen of the United States, residing at Eugene, in the county of Lane, State of Oregon, have invented a new and useful Portable Support for Cameras; and I do hereby declare the following to be a full, clear, and exact description of the invention, such as will enable others skilled in the art to which it appertains to make and use the same.

This invention relates to an improved portable support for cameras, in other words a photographic attachment for a portable support resembling a firearm, whereby a photograph may be taken of an object, by holding and aiming the support in a manner similar to holding and aiming a firearm.

One of the objects of the invention is to provide means for adjusting the camera with relation to the support, so that the camera may be held parallel with the support or the barrel of the firearm, so that the field of the camera will be of such a range as to take in the object to be photographed when the support is aimed.

A further object of the invention is to provide means attached to and actuated by the trigger of the support or firearm, for actuating the shutter of the camera.

In practical fields the details of construction may necessitate alterations falling within the scope of what is claimed.

The invention comprises further features and combinations of parts as hereinafter set forth, shown in the drawings, and claimed.

In the drawings:—

Figure 1, is a view in perspective of a support resembling a firearm, showing the camera attached thereto.

Fig. 2 is a vertical sectional view on line 2—2 of Fig. 1.

Fig. 3 is a sectional view on line 3—3 of Fig. 2.

Fig. 4 is a view partly in elevation and partly broken away, and showing a portion of the support or firearm in section and illustrating the means for attaching the camera to the support or barrel of the firearm, which means is modified from that shown in Figs. 1 and 2.

Fig. 5 is a sectional view on line 5—5 of Fig. 4.

Fig. 6 is a sectional view of the actuating means shown in Fig. 4, for actuating the bulb, which pneumatically actuates the shutter of the camera.

Referring more especially to the drawings 1 designates the support as a whole, which resembles a firearm having the stock 2 and the barrel 3, and 4 denotes the camera. Secured by screws 5 to the top of the camera are the laterally extending ears 6 of the downwardly extending arms 7, which are provided with slots 8. A pair of straps 9 are bent to fit the barrel of the support and to form the spaced ears 10, between which the slotted arms 7 are arranged, there being bolts 11 passing through the ears and through the slots and provided with winged nuts 12 for holding the parts together. It is to be noted that by provision of the bolts 11 and the nuts 12 and the slotted arms 7, the camera may be so adjusted that it may be arranged in proper alinement with the barrel of the support or firearm, so that the camera may be focused properly on the object to be photographed, by aiming the support in a manner similar to aiming a firearm. A cord, wire or the like 13 is attached to the trigger 14 in any suitable manner, and is passed through the eye 15 and has its forward end connected to a member 16 for actuating the shutter (not shown) of the camera. After adjusting the camera in its proper position, the support may be aimed, the trigger pulled and the member 16 (which in turn operates the shutter, not shown) is actuated, by the cord or wire 13, thereby photographing the object toward which the support is aimed. In Fig. 4 a segment 17 having a laterally extending portion 18 is provided. In this case the portion 18 is secured by screws 19 to the top of the camera. The segment 17 is provided with a curved slot 20. In Fig. 4 only a single strap 21 is bent to fit the barrel of the support, and between the ears 22 of said single strap 21 the segment 17 is arranged, there being a bolt 23 extending through the ears and through the curved slot 20 and provided with a winged nut 24, whereby the camera may be held in adjusted positions, or so parallel with the support, that the field of the camera will properly take in the object to be photographed. Between the band 21 and the barrel of the support a felt band 25 is arranged, to prevent the band 21 from scratching or otherwise injuring the barrel of the support. A member 26 is secured by screws 27 to the stock of the support, and hinged at 28 to the member 26 is a plate 29, which is so dished on its face adjacent the plate 26 as to receive a bulb 30, the tube 31 of which is connected to the member 32, which in turn actuates the shutter (not shown) of the camera. This tube 31 extends through an aperture 33 of the plate 29. It is to be noted that by pressing the plate 29 toward the member or plate 26, the bulb will be compressed, which in turn will pneumatically actuate the shutter of the camera for photographing an object.

Arranged within each band or strap 9 is a band of felt 34, to prevent scratching of the barrel of the support.

The camera by means of the improved detaching means may be connected to an actual firearm instead of a support which only resembles the firearm, so that the object to be shot by the firearm, may first be photographed.

The invention having been set forth what is claimed as new and useful is:—

In a portable support for a hand camera, the combination of an elongated support adapted to be held outwardly from the shoulder and a camera, of means for adjustably connecting said camera to the outer end of said support, whereby the camera may be parallel with the barrel of the support, and means connecting the trigger of said support and the shutter actuating member of the camera, said attaching means comprising an upwardly extending plate carried by the camera and having a slot, a band surrounding the barrel of the support and having ears between which said plate is arranged, means extending through the ears and the slot of said plate for holding the parts together, and whereby the camera may be adjusted in parallelism with said support, and a felt band between the first band and the barrel of the support.

In testimony whereof I have signed my name to this specification in the presence of two subscribing witnesses.

GEORGE LANDIS.

Witnesses:
IRA M. LANDIS,
S. D. ALLEN.